United States Patent

Brese et al.

[11] Patent Number: 6,090,311
[45] Date of Patent: Jul. 18, 2000

[54] ALKALI IODIDE DOPED ZINC SULFIDE ELECTROLUMINESCENT PHOSHOR

[75] Inventors: Nathaniel E. Brese, Lansdale; Vaddi Butchi Reddy, Sayre, both of Pa.

[73] Assignee: Osram Sylvania Inc., Danvers, Mass.

[21] Appl. No.: 09/203,145

[22] Filed: Dec. 1, 1998

[51] Int. Cl.[7] .......................... C09K 11/61; C09K 11/56; C09K 11/54
[52] U.S. Cl. .................. 252/301.65; 252/301.4 R; 252/301.4 H
[58] Field of Search ................ 252/301.65, 301.4 H, 252/301.4 R

[56] References Cited

U.S. PATENT DOCUMENTS 4,931,651  6/1990  Kagami et al. .................. 252/301.6 S

*Primary Examiner*—C. Melissa Koslow
*Attorney, Agent, or Firm*—William H. McNeill

[57] ABSTRACT

An electroluminescent phosphor containing an alkali iodide dopant, such as lithium iodide or potassium iodide, and having CIE coordinates of x=0.173 to 0.187 and y=0.392 to <0.424. The phosphor without alkali iodide dopant has CIE coordinates of x≈0.180 to 0.184 and y≈0.424 to 0.426. The method of making the phosphor includes adding the alkali iodides during a second firing step.

6 Claims, 1 Drawing Sheet

ALKALI IODIDE DOPED ZINC SULFIDE ELECTROLUMINESCENT PHOSHOR

TECHNICAL FIELD

This invention relates to phosphors and more particularly to electroluminescent phosphors. Still more particularly, it relates to an electroluminescent phosphor having its emission spectrum shifted into the blue.

BACKGROUND ART

Electroluminescent (EL) phosphors generally emit in the green region of the spectrum and have many uses. Phosphors having a bluer emission are required for many applications, particularly those involving cascading dyes to further manipulate the emission color. The color coordinates used herein are those employed with the standard ICI (International Commission on Illumination) diagram and referred to herein as the CIE (Commission Internationale d'Eclairage) diagram or CIE coordinates.

DISCLOSURE OF INVENTION

It is, therefore, an object of the invention to provide a bluer emitting EL phosphor.

It is another object of the invention to provide an EL phosphor that has its CIEy coordinate shifted into the blue.

Yet another object of the invention is the provision of a method of making such phosphors.

These objects are accomplished, in one aspect of the invention, by an electroluminescent phosphor containing an alkali iodide dopant and having CIE coordinates of x=0.173 to 0.187 and y=0.392 to <0.424, the phosphor without the dopant having CIE coordinates of x≈0.180 to 0.184 and y≈0.424 to 0.426.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

The preparation of electroluminescent zinc sulfide occurs generally in two steps. In the first step, bulk zinc sulfide (ZnS) is doped with activators and co-activators such as, for example, one or more of copper, manganese, aluminum, chlorine and bromine and then fired at a high temperature, generally greater than 1100° C. The fired material is then washed free of any flux, worked to induce faults in the material and then fired a second time. During this second firing, conducting copper sulfide is deposited into the faults in the ZnS, rendering it electroluminescent. It has been found that the inclusion of lithium iodide or potassium iodide during the second firing step lowers the CIEy coordinate, thus producing bluer emission color.

EXAMPLE 75 g of a typical first-fired and work-stressed ZnS:Cu,Cl had added thereto 1.88 g $CuSO_4$, 19.15 g $ZnSO_4.7H_2O$, and 0.5–5 g of KI or LiI to form a mixture. This mixture was well blended in a 500 ml plastic bottle for 20 minutes. A suitable blending apparatus is a paint shaker. The blended mixture was charged into a 100 ml alumina crucible, which was covered with a domed alumina lid. The crucible was sealed, preferably with electrical tape, and fired in an electric furnace at 730° C. for between 2 and 2½ hours. Preferably, the firing time is 2 hours and 15 minutes. After cooling, the phosphor was washed several times with water, twice with acetic acid, several additional times with water, once with KCN, and again with water. The phosphor was then collected by filtration, dried for several hours in a drying oven and then sifted through a 325 stainless steel screen.

Figure 1:
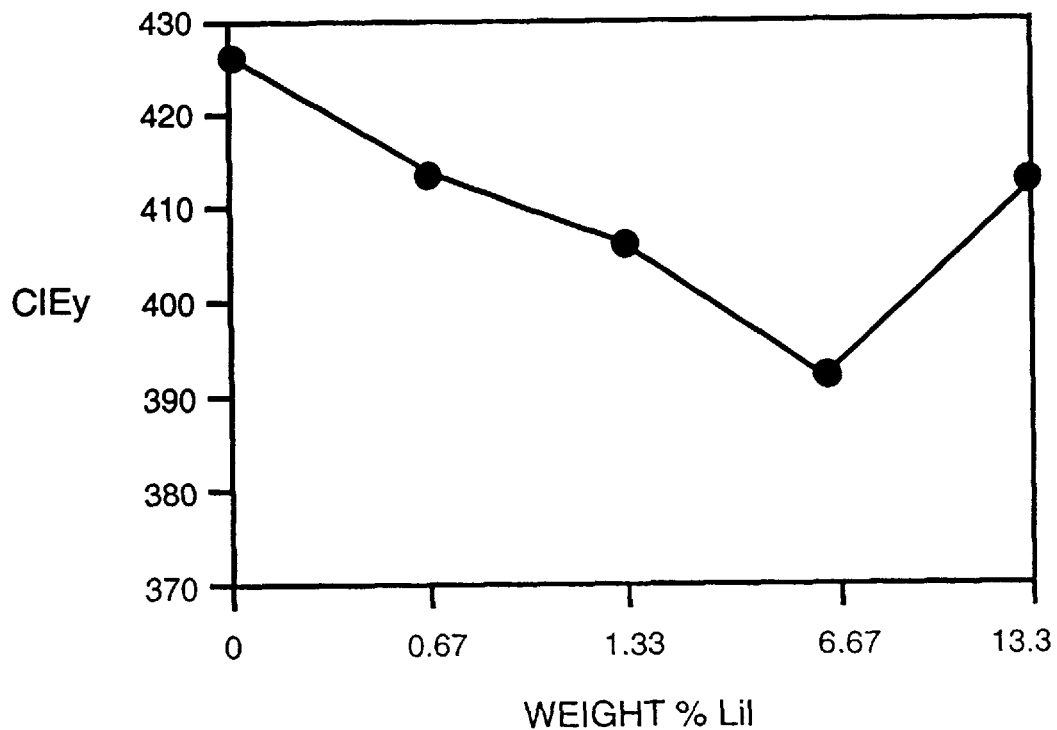
FIG. 1 is a graph of the CIEy coordinate decrease with increasing amounts of lithium iodide.
Figure 2:
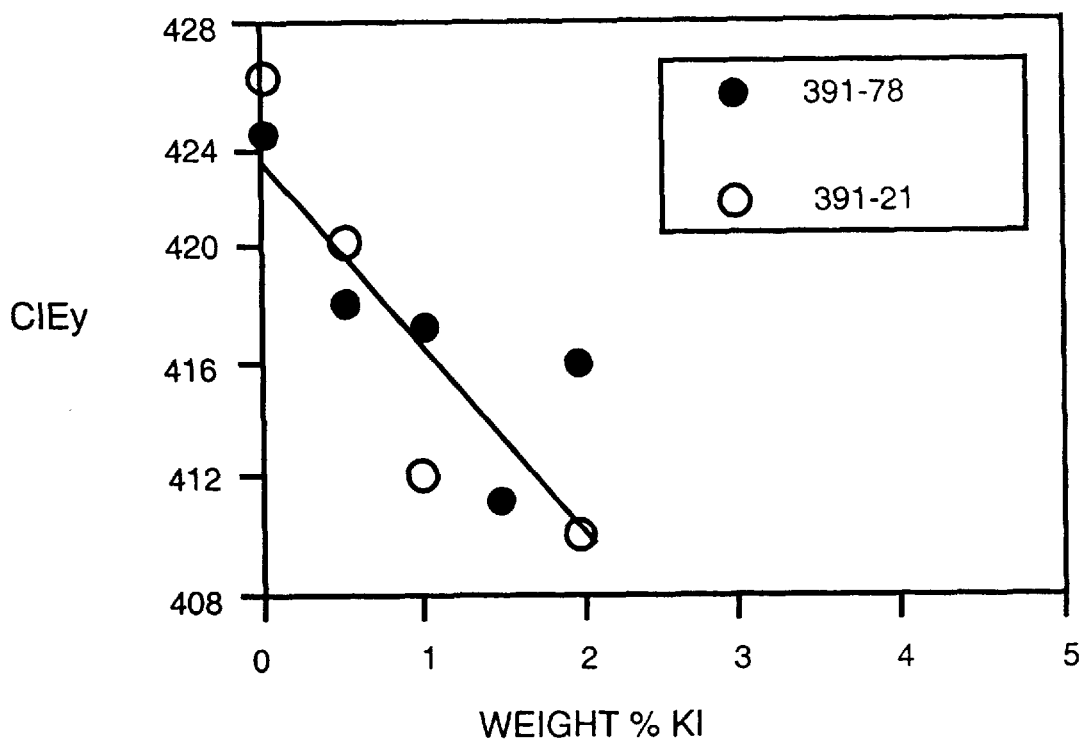
FIG. 2 is a similar graph illustrating the effect of potassium iodide addition.

The performance of these phosphors, with varying amounts of the LiI and KI added, is shown in Table I. FIG. 1 graphs the results of material with LiI and FIG. 2 graphs two different lots of material (391–78 and 391–21) with KI added.

TABLE I

| Lot No. | wt % Iodide | CIEx | CIEy | Brightness (fl) | Average Size (microns) |
|---|---|---|---|---|---|
| 391-80-1 | 0.00 wt % LiI | 0.180 | 0.426 | 32.2 | 24.66 |
| 391-80-2 | 0.67 wt % LiI | 0.179 | 0.413 | 29.2 | 26.54 |
| 391-80-3 | 1.33 wt % LiI | 0.178 | 0.406 | 29.5 | 26.41 |
| 391-80-4 | 6.67 wt % LiI | 0.173 | 0.392 | 26.3 | 27.62 |
| 391-80-5 | 13.3 wt % LiI | 0.174 | 0.412 | 16.6 | 30.88 |
| 391-21-1 | 0.0 wt % KI | 0.184 | 0.426 | 27.8 | 26.5 |
| 391-21-2 | 0.5 wt % KI | 0.185 | 0.420 | 27.9 | 25.7 |
| 391-21-3 | 1.0 wt % KI | 0.184 | 0.412 | 26.3 | 30.2 |
| 391-21-4 | 2.0 wt % KI | 0.185 | 0.410 | 19.8 | 28.5 |
| 391-21-5 | 5.0 wt % KI | 0.187 | 0.418 | 17.5 | 31.9 |
| 391-78-1 | 0.0 wt % KI | 0.181 | 0.424 | 32.6 | 25.1 |
| 391-78-2 | 0.5 wt % KI | 0.181 | 0.418 | 32.8 | 26.3 |
| 391-78-3 | 1.0 wt % KI | 0.181 | 0.417 | 32.4 | 27.1 |
| 391-78-4 | 1.5 wt % KI | 0.180 | 0.411 | 30.6 | 26.6 |

By referring to Table I, it will be seen that LiI addition works to lower the CIEy coordinate at least until the amount of LiI addition exceeds 6.67 wt %, at which time the CIEy coordinate begins to rise.

Likewise, benefit of the addition of KI begins to taper off between 2 and 5 wt %.

Accordingly, a new and novel electroluminescent phosphor having its CIEy coordinate shifted into the blue is provided.

While there have been shown and described what are at present considered the preferred embodiments of the invention, it will be apparent to those skilled in the art that various changes and modifications can be made herein without departing from the scope of the invention as defined by the appended claims.

What is claimed is:

1. An electroluminescent phosphor containing an alkali iodide dopant and having CIE coordinates of x=0.173 to 0.187 and y=0.392 to <0.424, said phosphor without said dopant having CIE coordinates of x≈0.180 to 0.184 and y≈0.424 to 0.426.

2. The phosphor of claim 1 wherein said alkali iodide is selected from the group consisting essentially of lithium iodide and potassium iodide.

3. The phosphor of claim 2 wherein said alkali iodide is lithium iodide which is present in an amount of about 0.67 to about 7 wt %.

4. The phosphor of claim 2 wherein said alkali iodide is potassium iodide which is present in an amount of about 0.5 to about 5 wt %.

5. A method for preparing a zinc sulfide electroluminescent phosphor having its emission spectrum shifted into the blue the steps comprising: doping zinc sulfide with activators and co-activators selected from copper, manganese, aluminum, chlorine or bromine and firing at a temperature greater than 1100° C. to incorporate said activators or co-activators into the matrix of said zinc sulfide to form a pre-phosphor; washing said pre-phosphor to remove fluxes; working said pre-phosphor to induce faults therein; adding to said pre-phosphor an amount of copper sulfate and zinc sulfate sufficient to make said phosphor electroluminescent and an amount of lithium iodide or potassium iodide sufficient to shift said emission spectrum into the blue; blending said pre-phosphor and said added ingredients; charging said blended ingredients into a crucible; covering said crucible; and second firing said blended ingredients for a time and at a temperature sufficient to form said electroluminescent phosphor; cooling said phosphor; washing said phosphor with water; washing said phosphor with acetic acid; again washing said phosphor with water; washing said phosphor with potassium cyanide; again washing with water; collecting said phosphor by filtration; drying said phosphor; and sifting said phosphor through a screen.

6. The method of claim 5 wherein said time is about 2 hours and 15 minutes and said temperature is about 730° C.

\* \* \* \* \*